(12) United States Patent
Tanaka

(10) Patent No.: US 11,515,098 B2
(45) Date of Patent: Nov. 29, 2022

(54) SOLID ELECTROLYTIC CAPACITOR AND METHOD OF PRODUCING SOLID ELECTROLYTIC CAPACITOR

(71) Applicant: Murata Manufacturing Co., Ltd., Nagaokakyo (JP)

(72) Inventor: Yasuo Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 33 days.

(21) Appl. No.: 17/014,181

(22) Filed: Sep. 8, 2020

(65) Prior Publication Data
US 2021/0074485 A1    Mar. 11, 2021

(30) Foreign Application Priority Data

Sep. 9, 2019   (JP) .............................. JP2019-163667
Sep. 7, 2020   (JP) .............................. JP2020-149639

(51) Int. Cl.
   *H01G 9/15*   (2006.01)
   *H01G 9/07*   (2006.01)
   *H01G 9/00*   (2006.01)

(52) U.S. Cl.
   CPC ............. *H01G 9/15* (2013.01); *H01G 9/0036* (2013.01); *H01G 9/07* (2013.01)

(58) Field of Classification Search
   CPC ........... H01G 9/15; H01G 9/0036; H01G 9/07
   See application file for complete search history.

(56) References Cited

U.S. PATENT DOCUMENTS

| | | | | |
|---|---|---|---|---|
| 10,340,092 | B2* | 7/2019 | Demizu | H01G 9/045 |
| 10,903,017 | B2* | 1/2021 | Demizu | H01G 9/008 |
| 11,011,317 | B2* | 5/2021 | Furukawa | H01G 9/15 |
| 2004/0130856 | A1 | 7/2004 | Fujii et al. | |
| 2007/0127191 | A1 | 6/2007 | Kuriyama | |
| 2010/0165547 | A1* | 7/2010 | Kuranuki | H01G 9/15 361/525 |

(Continued)

FOREIGN PATENT DOCUMENTS

| | | |
|---|---|---|
| CN | 1871676 A | 11/2006 |
| CN | 109791844 A | 5/2019 |
| JP | 2019079866 A | 5/2019 |

OTHER PUBLICATIONS

Chinese Office Action issued for Chinese Application No. 202010937839.3, date of Chinese Office Action Dec. 9, 2021.

*Primary Examiner* — Dion R. Ferguson
(74) *Attorney, Agent, or Firm* — ArentFox Schiff LLP

(57) ABSTRACT

A solid electrolytic capacitor that includes a valve-action metal substrate including a dielectric layer having pores on at least one main surface thereof, a mask layer made of an insulating material and covering a periphery of the main surface of the valve-action metal substrate, and a cathode layer on the dielectric layer at least within a region surrounded by the mask layer. The cathode layer includes a solid electrolyte layer on the dielectric layer, and the solid electrolyte layer includes a first layer filling the pores of the dielectric layer, a second layer on the dielectric layer and along an outer peripheral portion of the region surrounded by the mask layer, the second layer being made of a material same as or different from that of the first layer, and a third layer covering the second layer and the dielectric layer.

15 Claims, 4 Drawing Sheets

(56) References Cited

U.S. PATENT DOCUMENTS

| | | | | |
|---|---|---|---|---|
| 2012/0044615 A1* | 2/2012 | Takahashi | .............. | H01G 9/028 |
| | | | | 361/528 |
| 2015/0187496 A1* | 7/2015 | Chien | .................... | H01G 9/028 |
| | | | | 361/504 |
| 2017/0365415 A1* | 12/2017 | Demizu | .................. | H01G 9/048 |
| 2017/0365419 A1* | 12/2017 | Demizu | ................. | H01G 9/012 |
| 2018/0137990 A1* | 5/2018 | Saito | ........................ | H01L 28/60 |
| 2019/0122827 A1* | 4/2019 | Furukawa | ............ | H01G 9/0029 |
| 2019/0228915 A1* | 7/2019 | Furukawa | ................ | H01G 9/08 |
| 2019/0237266 A1* | 8/2019 | Tsutsumi | ............... | H01G 9/012 |
| 2019/0244764 A1* | 8/2019 | Furukawa | .............. | H01G 9/012 |
| 2019/0244765 A1 | 8/2019 | Harada et al. | | |
| 2020/0194187 A1* | 6/2020 | Kumakawa | .............. | H01G 9/04 |
| 2020/0312573 A1* | 10/2020 | Horio | ........................ | H01G 9/15 |
| 2020/0335284 A1* | 10/2020 | Yamazaki | .............. | H01G 9/025 |

\* cited by examiner

SOLID ELECTROLYTIC CAPACITOR AND METHOD OF PRODUCING SOLID ELECTROLYTIC CAPACITOR

CROSS REFERENCE TO RELATED APPLICATIONS

The present application claims priority to Japanese Patent Application No. 2019-163667, filed Sep. 9, 2019, and Japanese Patent Application No. 2020-149639, filed Sep. 7, 2020, the entire contents of each of which are incorporated herein by reference.

FIELD OF THE INVENTION

The present invention relates to a solid electrolytic capacitor and a method of producing a solid electrolytic capacitor.

BACKGROUND OF THE INVENTION

A solid electrolytic capacitor includes a valve-action metal substrate made of a valve-action metal such as aluminum, a dielectric layer on a surface of the substrate, and a cathode layer including a solid electrolyte layer on the dielectric layer.

For example, Patent Literature 1 discloses a method of producing a solid electrolytic capacitor that includes (A) preparing a first sheet including a valve-action metal substrate having a dielectric layer on a surface thereof and a solid electrolyte layer on the dielectric layer, (B) preparing a second sheet made of metal foil, (C) covering the first sheet with an insulating material, (D) forming a conductor layer on the solid electrolyte layer of the first sheet, (E) stacking the first sheet and the second sheet to produce a stack of the sheets, (F) filling through-holes of the stack of the sheets with a sealing material to produce a multilayer block body, (G) cutting the multilayer block body to produce multiple capacitor element laminates, and (H) forming a first external electrode and a second external electrode on each of the multiple capacitor element laminates.
Patent Literature 1: JP 2019-79866 A

SUMMARY OF THE INVENTION

According to Patent Literature 1, a masking material made of an insulating material such as an insulating resin is applied to the surface of the valve-action metal substrate, and is then solidified or cured to form a mask layer covering ends and sides of each capacitor element region. Patent Literature 1 also describes formation of the solid electrolyte layer on the dielectric layer in a region surrounded by the mask layer.

However, electric fields tend to concentrate at an outer peripheral portion of the region surrounded by the mask layer so that the withstand voltage at the outer peripheral portion is insufficient. Further, when forming the solid electrolyte layer in the region surrounded by the mask layer, the adhesion between the solid electrolyte layer and the valve-action metal substrate is insufficient.

The present invention was made to solve the above problems and aims to provide a solid electrolytic capacitor having a high withstand voltage and high adhesion between a solid electrolyte layer and a valve-action metal substrate. The present invention also aims to provide a method of producing such a solid electrolytic capacitor.

A first embodiment of a solid electrolytic capacitor of the present invention includes a valve-action metal substrate including a dielectric layer having pores on at least one main surface of the valve-action metal substrate, a mask layer made of an insulating material and covering a periphery of the at least one main surface of the valve-action metal substrate having the dielectric layer, and a cathode layer on the dielectric layer, the cathode layer having a solid electrolyte layer that includes a first layer filling the pores of the dielectric layer in a region surrounded by the mask layer, a second layer on the dielectric layer and along an outer peripheral portion of the region surrounded by the mask layer, the second layer being made of a material same as that or different from that of the first layer, and a third layer covering the second layer and the dielectric layer.

A second embodiment of the solid electrolytic capacitor of the present invention includes a valve-action metal substrate including a dielectric layer on at least one main surface of the valve-action metal substrate, a mask layer made of an insulating material and covering a periphery of the at least one main surface of the valve-action metal substrate having the dielectric layer, and a cathode layer on the dielectric layer at least within a region surrounded by the mask layer, the cathode layer including a solid electrolyte layer that extends over an outside of the region surrounded by the mask layer and overlies the mask layer.

A first embodiment of a method of producing a solid electrolytic capacitor of the present invention includes preparing a valve-action metal substrate including a dielectric layer having pores on at least one main surface thereof, adding an insulating material to a periphery of the at least one main surface of the valve-action metal substrate having the dielectric layer so as to form a mask layer covering the periphery, and forming a cathode layer on the dielectric layer at least within a region surrounded by the mask layer, wherein the forming of the cathode layer includes forming a solid electrolyte layer by: filling the pores of the dielectric layer with a first layer; forming a second layer on the dielectric layer along an outer peripheral portion of the region surrounded by the mask layer, the second layer being made of a material same as or different from that of the first layer; and covering the second layer and the dielectric layer with a third layer.

A second embodiment of the method of producing a solid electrolytic capacitor of the present invention includes preparing a valve-action metal substrate including a dielectric layer on at least one main surface thereof, adding an insulating material to a periphery of the at least one main surface of the valve-action metal substrate having the dielectric layer so as to form a mask layer covering the periphery, and forming a cathode layer on the dielectric layer at least within a region surrounded by the mask layer, wherein the forming of the cathode layer includes forming a solid electrolyte layer that extends over an outside of the region surrounded by the mask layer and overlies the mask layer.

The present invention provides a solid electrolytic capacitor having a high withstand voltage and high adhesion between a solid electrolyte layer and a valve-action metal substrate.

DETAILED DESCRIPTION OF THE PREFERRED EMBODIMENTS

A solid electrolytic capacitor and a method of producing a solid electrolytic capacitor of the present invention are described below.

The present invention is not limited to the following preferred embodiments, and may be suitably modified without departing from the gist of the present invention. Combinations of two or more preferred features described in the following preferred embodiments are also within the scope of the present invention.

The following preferred embodiments are examples, and features of different preferred embodiments can be partially exchanged or combined with each other. In the second preferred embodiment and subsequent preferred embodiments, a description of features common to the first preferred embodiment is omitted, and only different points are described. In particular, similar advantageous effects by similar features are not mentioned in each preferred embodiment.

Solid Electrolytic Capacitor

Figure 1:
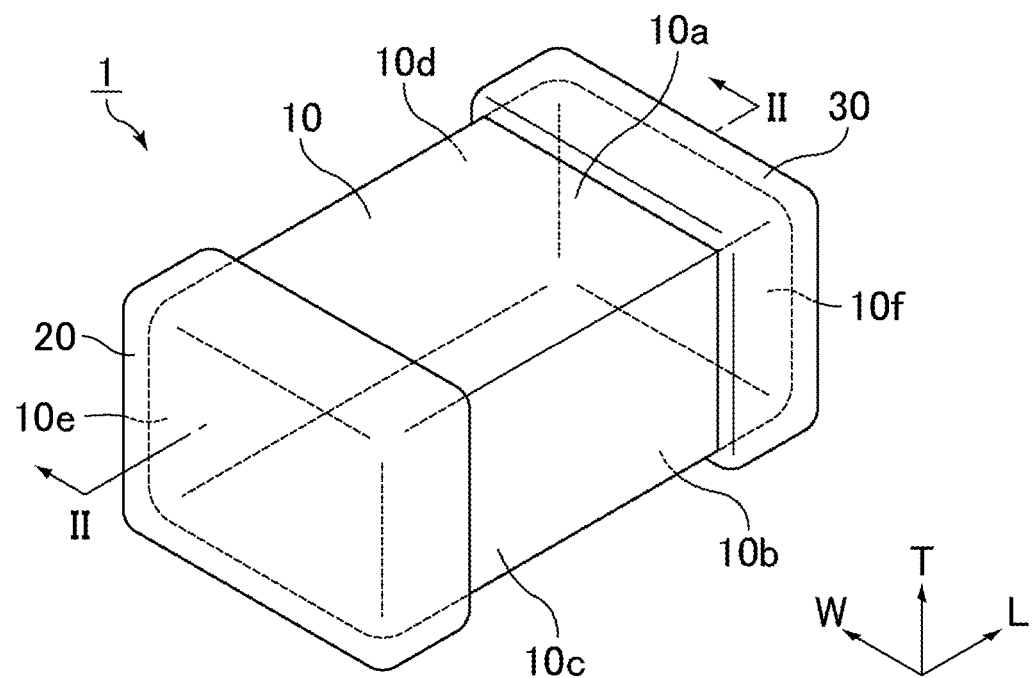
FIG. 1 is a schematic perspective view of an example solid electrolytic capacitor of the present invention.
Figure 2:
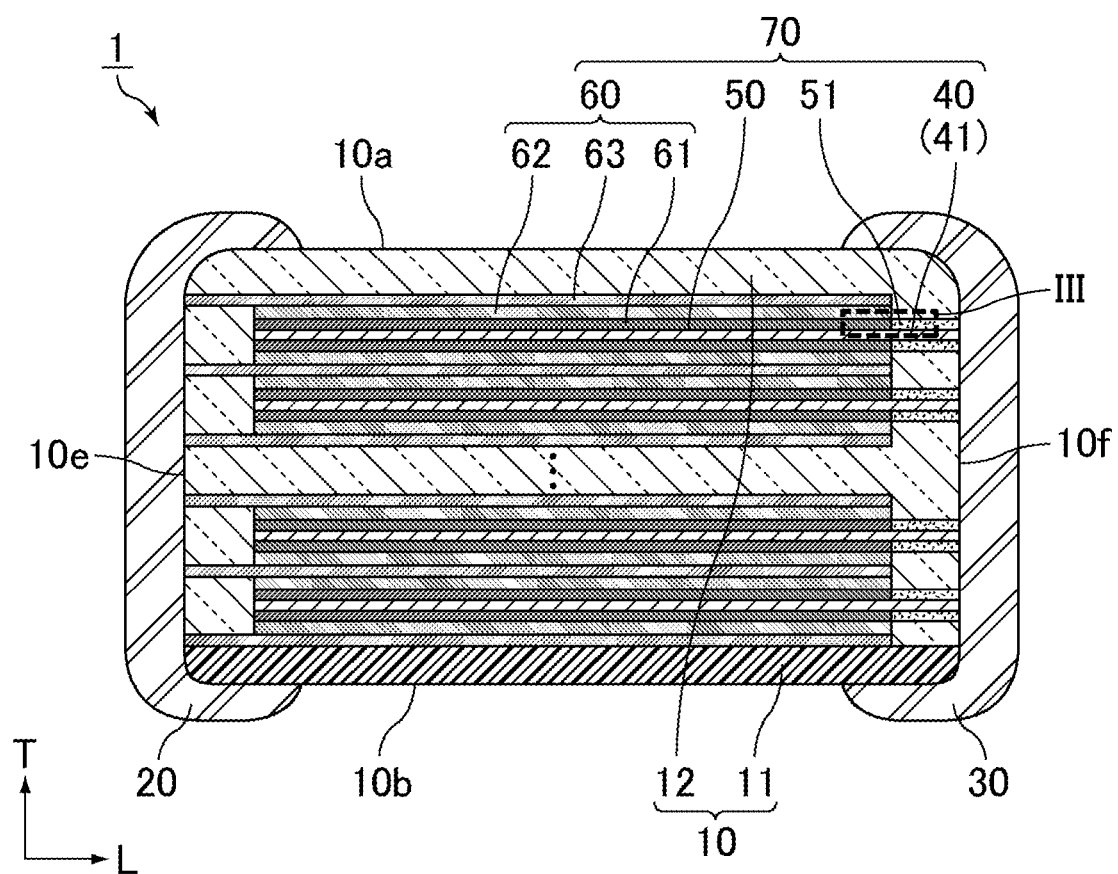
FIG. 2 is a cross-sectional view taken along the line II-II of the solid electrolytic capacitor shown in FIG. 1.
Figure 3:
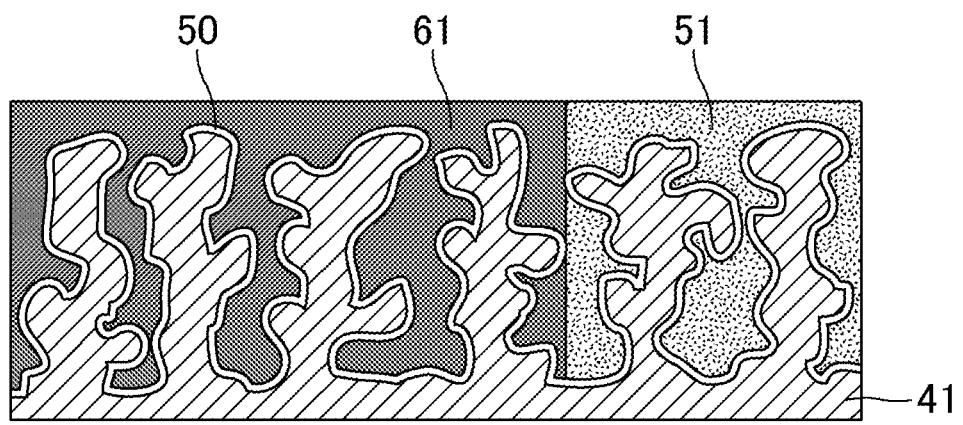
FIG. 3 is an enlarged cross-sectional view of a portion III of the solid electrolytic capacitor shown in FIG. 2.

FIG. 1 is a schematic perspective view of an example solid electrolytic capacitor of the present invention. FIG. 2 is a cross-sectional view taken along the line II-II of the solid electrolytic capacitor shown in FIG. 1. FIG. 3 is an enlarged cross-sectional view of a portion III of the solid electrolytic capacitor shown in FIG. 2.

In FIG. 1 and FIG. 2, the length direction of a solid electrolytic capacitor 1 or an insulating resin body 10 is indicated by L, the width direction thereof is indicated by W, and the height direction thereof is indicated by T. Here, the length direction L, the width direction W, and the height direction T are perpendicular to each other.

As shown in FIG. 1 and FIG. 2, the outer shape of the solid electrolytic capacitor 1 is a substantially rectangular cuboid. The solid electrolytic capacitor 1 includes the insulating resin body 10, a first outer electrode 20, a second outer electrode 30, and multiple capacitor elements 70.

The multiple capacitor elements 70 are enclosed in the insulating resin body 10. The outer shape of the insulating resin body 10 is a substantially rectangular cuboid. The insulating resin body 10 includes a first main surface 10a and a second main surface 10b opposite to each other in the height direction T, a first side surface 10c and a second side surface 10d opposite to each other in the width direction W, and a first end surface 10e and a second end surface 10f opposite to each other in the length direction L. The insulating resin body 10 may include a single capacitor element 70 inside.

The outer shape of the insulating resin body 10 is a substantially rectangular cuboid as described above. Preferably, corners and ridges are rounded. The corner is a portion where three faces of the insulating resin body 10 meet, and the ridge is a portion where two faces of the insulating resin body 10 meet.

The insulating resin body 10 includes, for example, aboard 11 and a molded portion 12 on the board 11. The insulating resin body 10 may include only the molded portion 12.

For example, the board 11 is an insulating resin board such as a glass epoxy board. A bottom of the board 11 defines the second main surface 10b of the insulating resin body 10. The thickness of the board 11 is 100 µm, for example.

The molded portion 12 is made of an insulating resin such as an epoxy resin. Preferably, glass or an oxide of Si as a filler is dispersed and mixed in the insulating resin. The molded portion 12 is provided on the board 11 to cover the multiple capacitor elements 70.

Each of the multiple capacitor elements 70 includes an anode portion 40, a dielectric layer 50, and a cathode layer 60. The multiple capacitor elements 70 are laminated in the height direction T on the board 11. Each of the multiple capacitor elements 70 extends in a direction substantially parallel to a main surface of the board 11.

The anode portion 40 includes a valve-action metal substrate 41. As shown in FIG. 3, the valve-action metal substrate 41 has an outer surface with multiple depressions. The outer surface of the valve-action metal substrate 41 is porous. The valve-action metal substrate 41 has a large surface area because the outer surface of the valve-action metal substrate 41 is porous. Both the front and back surfaces of the valve-action metal substrate 41 may be porous, or only one of the front and back surfaces of the valve-action metal substrate 41 may be porous.

The valve-action metal substrate 41 is made of a valve-action metal. Examples of the valve-action metal include elemental metals such as aluminum, tantalum, niobium, titanium, and zirconium, and alloys containing at least one of these metals. An oxide film may be formed on a surface of the valve-action metal.

The anode portion 40 is not limited as long as it includes a core portion and a porous portion around the core portion. For example, metal foil with an etched surface, metal foil with porous sintered fine particles on a surface, or the like can be suitably used.

The dielectric layer 50 is provided on the outer surface of the valve-action metal substrate 41. Preferably, the dielectric layer 50 is an oxide film on the surface of the valve-action metal. Specifically, the dielectric layer 50 is an aluminum oxide. As described later, the aluminum oxide is formed by anodization of the outer surface of the valve-action metal substrate 41.

The cathode layer 60 is provided on an outer surface of the dielectric layer 50. In FIG. 2, the cathode layer 60 includes a solid electrolyte layer 61, a conductor layer 62, and a cathode lead-out layer 63.

The solid electrolyte layer 61 is provided on a portion of the outer surface of the dielectric layer 50. The solid electrolyte layer 61 is not provided on the outer surface of the dielectric layer 50 on the outer surface of the valve-action metal substrate 41 closer to the second end surface 10f. A portion of the dielectric layer 50 in this region, which is adjacent to a region provided with the solid electrolyte layer 61, has an outer surface covered with a mask layer (described later).

As shown in FIG. 3, preferably, the solid electrolyte layer 61 fills multiple fine pores (depressions) of the valve-action metal substrate 41. As long as the above-described portion of the outer surface of the dielectric layer 50 is covered with the solid electrolyte layer 61, there may be some fine pores (depressions) of the valve-action metal substrate 41 which are not filled with the solid electrolyte layer 61.

Examples of materials of the solid electrolyte layer 61 include conductive polymers such as polypyrrole, polythiophene, and polyaniline. Of these, polythiophene is preferred, and poly(3,4-ethylenedioxythiophene) called PEDOT is particularly preferred. Examples of the conductive polymers may also include dopants such as poly(styrene sulfonate) (PSS).

The solid electrolyte layer 61 is formed by, for example, a method in which a treatment solution containing a polymerizable monomer such as 3,4-ethylenedioxythiophene is used to form a polymerized film of poly(3,4-ethylenedioxythiophene) or the like on the surface of the dielectric layer 50, or a method in which a dispersion of a conductive polymer such as poly(3,4-ethylenedioxythiophene) is applied to the surface of the dielectric layer 50 and dried. Preferably, the solid electrolyte layer for an inner layer that fills the fine pores (depressions) in the valve-action metal substrate 41 is formed first, and then the solid electrolyte layer for an outer layer that covers the entire dielectric layer 50 is formed.

The conductor layer 62 is provided on an outer surface of the solid electrolyte layer 61. The conductor layer 62 includes, for example, a carbon layer or a silver layer. Alternatively, the conductor layer 62 may be a composite layer including a silver layer on an outer surface of a carbon layer, or a mixed layer containing carbon and silver.

The cathode lead-out layer 63 is provided on an outer surface of the conductor layer 62. The conductor layers 62 of the capacitor elements 70 adjacent to each other in the lamination direction are electrically connected to each other via the cathode lead-out layer 63. The width of the cathode lead-out layer 63 in the width direction W is equal to the width of the valve-action metal substrate 41 in the width direction W, for example.

The cathode lead-out layer 63 can be made of metal foil or a printed electrode layer.

In the case of the metal foil, the metal foil preferably contains at least one metal selected from the group consisting of Al, Cu, Ag, and an alloy mainly containing any of these metals. Alternatively, the metal foil may be one whose surface is coated with carbon or titanium by a film forming method such as sputtering or vapor deposition. Use of carbon-coated aluminum foil is preferred.

In the case of the printed electrode layer, the cathode lead-out layer can be formed in a predetermined region by applying an electrode paste to the conductor layer by, for example, sponge transfer, screen printing, spray coating, inkjet printing, or using a dispenser. The electrode paste is preferably one mainly containing Ag, Cu, or Ni. When the cathode lead-out layer is a printed electrode layer, such a cathode lead-out layer can be made thinner than a cathode lead-out layer made of metal foil.

As described above, a portion of the dielectric layer 50 in the region not provided with the solid electrolyte layer 61, which is adjacent to the region provided with the solid electrolyte layer 61, has an outer surface covered with the mask layer 51 whose composition is different from that of the insulating resin body 10. The mask layer 51 covers the outer surface of the valve-action metal substrate 41 from a position adjacent to the portion provided with the solid electrolyte layer 61 to an end of the anode portion 40 closer to the second end surface 10f.

The mask layer 51 is formed by applying a masking material having a composition containing an insulating resin, for example. Examples of the insulating resin include polyphenylsulfone (PPS), polyethersulfone (PES), cyanate ester resins, fluorine resins (e.g., tetrafluoroethylene and tetrafluoroethylene-perfluoroalkyl vinyl ether copolymers), compositions containing a soluble polyimide-siloxane and an epoxy resin, polyimide resins, polyamide-imide resins, and their derivatives and precursors.

The first outer electrode 20 is provided at the first end surface 10e of the insulating resin body 10. In FIG. 1, the first outer electrode 20 extends from the first end surface 10e of the insulating resin body 10 to each of the first main surface 10a, the second main surface 10b, the first side surface 10c, and the second side surface 10d. The first outer electrode 20 is electrically connected to each of the cathode layers 60 of the multiple capacitor elements 70.

The first outer electrode 20 is made of at least one plating layer on the first end surface 10e of the insulating resin body 10. For example, the first outer electrode 20 includes a Cu plating layer on the first end surface 10e of the insulating resin body 10, a Ni plating layer on the Cu plating layer, and a Sn plating layer on the Ni plating layer.

The first outer electrode 20 is directly or indirectly connected to each cathode lead-out layer 63 at the first end surface 10e of the insulating resin body 10.

The second outer electrode 30 is provided at the second end surface 10f of the insulating resin body 10. In FIG. 1, the second outer electrode 30 extends from the second end surface 10f of the insulating resin body 10 to each of the first main surface 10a, the second main surface 10b, the first side surface 10c, and the second side surface 10d. The second outer electrode 30 is electrically connected to each of the anode portions 40 of the multiple capacitor elements 70.

The second outer electrode 30 is made of at least one plating layer on the second end surface 10f of the insulating resin body 10. For example, the second outer electrode 30 includes a Cu plating layer on the second end surface 10f of the insulating resin body 10, a Ni plating layer on the Cu plating layer, and a Sn plating layer on the Ni plating layer.

The second outer electrode 30 is directly or indirectly connected to each of the valve-action metal substrates 41 of the multiple capacitor elements 70, at the second end surface 10f of the insulating resin body 10.

First Embodiment

Figure 4:
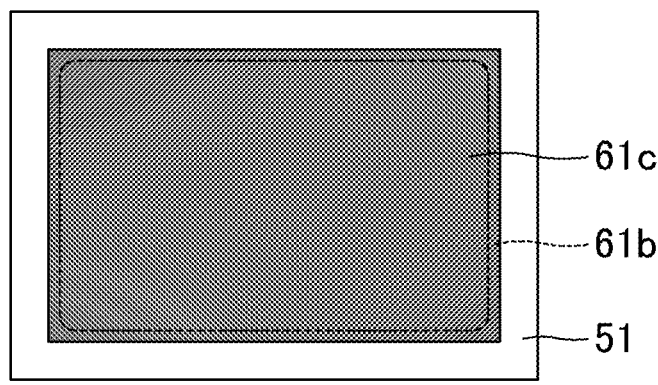
FIG. 4 is a schematic plan view of an example of a solid electrolytic capacitor according to a first embodiment of the present invention.
Figure 5:
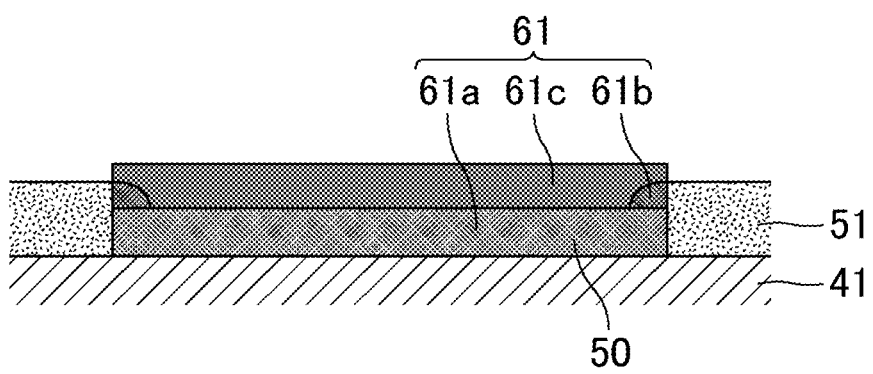
FIG. 5 is a schematic cross-sectional view of an example of part of the solid electrolytic capacitor according to the first embodiment of the present invention.

FIG. 4 is a schematic plan view of an example of a solid electrolytic capacitor according to a first embodiment of the present invention. FIG. 5 is a schematic cross-sectional view of an example of part of the solid electrolytic capacitor according to the first embodiment of the present invention.

As shown in FIG. 4 and FIG. 5, the mask layer 51 covers a periphery of a main surface of the valve-action metal substrate 41. The solid electrolyte layer 61 is provided on the dielectric layer 50, in the region surrounded by the mask layer 51.

In FIG. 4 and FIG. 5, the solid electrolyte layer 61 includes a first layer 61a, a second layer 61b, and a third layer 61c.

The first layer 61a is an inner layer of the solid electrolyte layer 61 and fills the fine pores of the dielectric layer 50 (see FIG. 3).

The second layer 61b is made of a material same as or different from that of the first layer 61a defining the inner layer of the solid electrolyte layer 61. The second layer 61b is provided on the dielectric layer 50 along an outer peripheral portion of the region surrounded by the mask layer 51.

The third layer 61c is an outer layer of the solid electrolyte layer 61 and covers the second layer 61b and the dielectric layer 50.

In the solid electrolytic capacitor according to the first embodiment of the present invention, the second layer made of a material same as or different from that of the first layer defining the inner layer of the solid electrolyte layer is provided at the outer peripheral portion of the region surrounded by the mask layer, with the thickness of the second layer being selectively increased. This can increase the withstand voltage at the outer peripheral portion where electric fields tend to concentrate. Further, the outer peripheral portion of the third layer defining the outer layer of the solid electrolyte layer having poor adhesion with the valve-action metal substrate is in contact with the second layer having high affinity for the third layer. This can improve the adhesion between the solid electrolyte layer and the valve-action metal substrate. As a result, the solid electrolyte layer is not easily peeled off in a high temperature and/or high humidity environment, which improves the reliability of the solid electrolytic capacitor.

In the first embodiment of the present invention, preferably, the second layer of the solid electrolyte layer surrounds the entire outer peripheral portion of the region surrounded by the mask layer, but the outer peripheral portion may include a portion where the second layer of the solid electrolyte layer is not provided.

In the first embodiment of the present invention, preferably, a thickness of the second layer is 0.1 μm to 2 μm. The thickness of the second layer means the maximum thickness of the second layer.

In the first embodiment of the present invention, preferably, the thickness of the second layer is 10% to 75% of a thickness of the third layer. The thickness of the third layer means the maximum thickness of the third layer.

In the first embodiment of the present invention, the solid electrolyte layer may extend over the outside of the region surrounded by the mask layer and overlie the mask layer, as in a second embodiment (described later). Specifically, the third layer of the solid electrolyte layer may extend over the outside of the region surrounded by the mask layer and overlie the mask layer.

Figure 6:
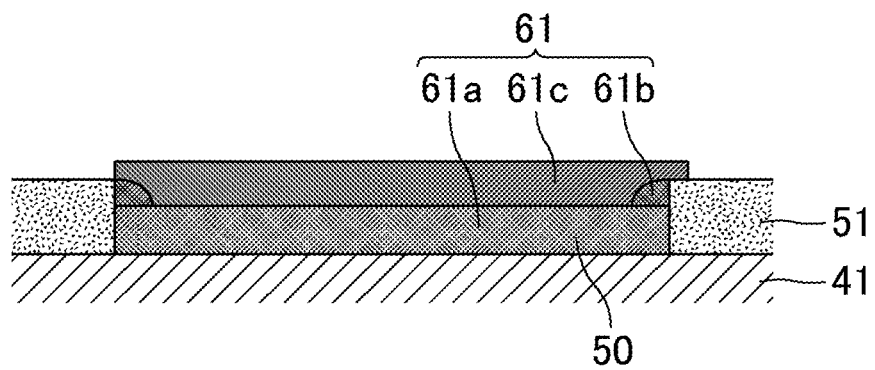
FIG. 6 is a schematic cross-sectional view of another example of part of the solid electrolytic capacitor according to the first embodiment of the present invention.

FIG. 6 is a schematic cross-sectional view of another example of part of the solid electrolytic capacitor according to the first embodiment of the present invention.

As shown in FIG. 6, the third layer 61c may overlie the mask layer 51.

In the first embodiment of the present invention, when the solid electrolyte layer extends over the outside of the region surrounded by the mask layer and overlies the mask layer, preferably, a width of the solid electrolyte layer on the mask layer is 10 μm to 100 μm. Specifically, preferably, a width of the third layer on the mask layer is 10 μm to 100 μm.

In the first embodiment of the present invention, when the solid electrolyte layer extends over the outside of the region surrounded by the mask layer and overlies the mask layer, preferably, the width of the solid electrolyte layer on the mask layer is 0.1% to 25% of a width of the mask layer. Specifically, preferably, the width of the third layer on the mask layer is 0.1% to 25% of a width of the mask layer.

Second Embodiment

Figure 7:
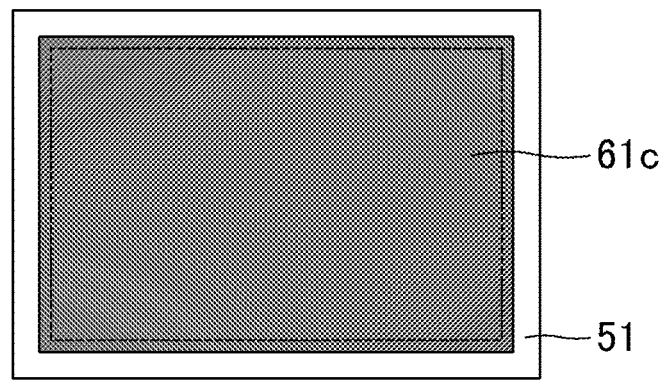
FIG. 7 is a schematic plan view of an example of a solid electrolytic capacitor according to a second embodiment of the present invention.
Figure 8:
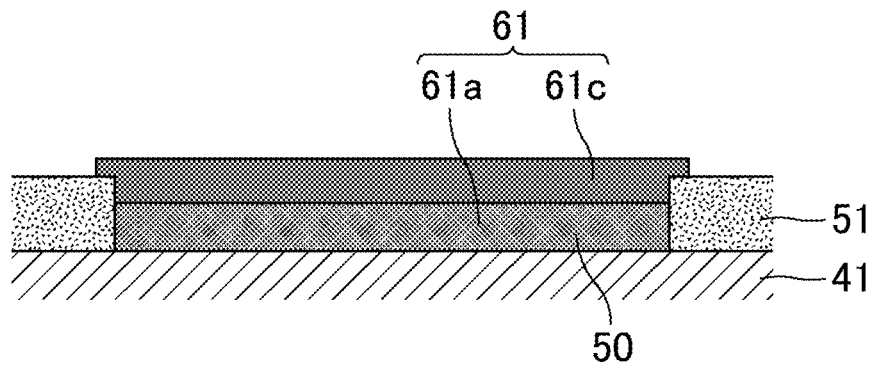
FIG. 8 is a schematic cross-sectional view of an example of part of the solid electrolytic capacitor according to the second embodiment of the present invention.

FIG. 7 is a schematic plan view of an example of a solid electrolytic capacitor according to a second embodiment of the present invention. FIG. 8 is a schematic cross-sectional view of an example of part of the solid electrolytic capacitor according to the second embodiment of the present invention.

As shown in FIG. 7 and FIG. 8, the mask layer 51 covers the periphery of the main surface of the valve-action metal substrate 41. The solid electrolyte layer 61 is provided on the dielectric layer 50 in the region surrounded by the mask layer 51.

In FIG. 7 and FIG. 8, the solid electrolyte layer 61 extends over the outside of the region surrounded by the mask layer 51 and overlies the mask layer 51. In the example shown in FIG. 7 and FIG. 8, the solid electrolyte layer 61 includes the inner layer 61a and the outer layer 61c. The outer layer 61c overlies the mask layer 51.

In the solid electrolytic capacitor according to the second embodiment of the present invention, the solid electrolyte layer covers the outer peripheral portion of the region surrounded by the mask layer. This can increase the withstand voltage at the outer peripheral portion where electric fields tend to concentrate. Further, the outer peripheral portion of the solid electrolyte layer having poor adhesion with the valve-action metal substrate is in contact with the mask layer having high affinity for the solid electrolyte layer. This can improve the adhesion between the solid electrolyte layer and the valve-action metal substrate. As a result, the solid electrolyte layer is not easily peeled off in a high temperature and/or high humidity environment, which improves the reliability of the solid electrolytic capacitor.

In the second embodiment of the present invention, preferably, the solid electrolyte layer extends over the entire outside of the region surrounded by the mask layer, but the outside of the region may include a portion where the solid electrolyte layer is not provided. The outer layer of the solid electrolyte layer may be divided into two or more layers, and a portion thereof inside the region surrounded by the mask layer and a portion thereof outside the region surrounded by the mask layer may be formed separately.

In the second embodiment of the present invention, preferably, a width of the solid electrolyte layer on the mask layer is 10 μm to 100 μm.

In the second embodiment of the present invention, preferably, the width of the solid electrolyte layer on the mask layer is 0.1% to 25% of a width of the mask layer.

In the first embodiment and the second embodiment of the present invention, preferably, the mask layer surrounds the entire periphery of the main surface of the valve-action metal substrate, but the periphery of the main surface of the valve-action metal substrate may include a portion where the mask layer is not provided.

Method of Producing Solid Electrolytic Capacitor

The method of producing a solid electrolytic capacitor of the present invention includes preparing a valve-action metal substrate including a dielectric layer on at least one main surface, adding an insulating material to a periphery of the main surface of the valve-action metal substrate so as to form a mask layer covering the periphery, and forming a cathode layer on the dielectric layer, in a region surrounded by the mask layer.

The solid electrolytic capacitor 1 shown in FIG. 1 may be produced as follows, for example.

In the production of the solid electrolytic capacitor 1, first, the capacitor element 70 is prepared in step S10. Specifically, the following steps S11 to S14 are performed.

In step S11, the dielectric layer 50 is provided on the outer surface of the valve-action metal substrate 41. For example, aluminum foil as the valve-action metal substrate 41 is immersed in an aqueous solution of ammonium adipate and anodized, whereby an aluminum oxide as the dielectric layer 50 is formed. When chemically treated foil on which an aluminum oxide has been already formed is cut and used as the valve-action metal substrate 41, the valve-action metal substrate 41 after cutting is again immersed in the aqueous solution of ammonium adipate and anodized to form an aluminum oxide on the cut surface.

In step S12, the valve-action metal substrate 41 is partially masked. This masking is performed to define a region where the solid electrolyte layer 61 is to be formed in the next step. Specifically, a masking material made of an insulating resin such as a polyimide resin or polyamide-imide resin is applied to the periphery of the outer surface of the valve-action metal substrate 41. A masked portion formed in this step becomes the mask layer 51.

In step S13, the solid electrolyte layer 61 is provided on a portion of the outer surface of the dielectric layer 50. For example, a conductive polymer dispersion is attached to the outer surface of the dielectric layer 50 in the region where the solid electrolyte layer 61 is to be formed, which is defined by the masked portion formed in step S12, and the conductive polymer dispersion is dried to form a conductive polymer film. Alternatively, a treatment solution containing a polymerizable monomer such as 3,4-ethylenedioxythiophene and an oxidizing agent may be attached to form a conductive polymer film by chemical polymerization. This conductive polymer film becomes the solid electrolyte layer 61.

When producing the solid electrolytic capacitor shown in FIG. 4 and FIG. 5, the solid electrolyte layer 61 includes the first layer 61a, the second layer 61b, and the third layer 61c described above.

The first layer 61a is formed as an inner layer of the solid electrolyte layer 61.

The second layer 61b is simultaneously formed with the first layer 61a by, for example, the coffee-ring phenomenon. The coffee-ring phenomenon is one in which the periphery of a droplet of coffee becomes thick and the remaining portion of the droplet becomes thin during drying of the droplet. The same occurs in the treatment solution or dispersion for forming the first layer 61a. Because of its composition, the periphery of the first layer 61a becomes thick by drying and is thus formed as the second layer 61b. A conductive polymer paste is preferably screen-printed to form the third layer 61c. The third layer 61c is formed as an outer layer of the solid electrolyte layer 61.

Alternatively, the second layer 61b may be formed by applying a treatment solution or dispersion for forming the first layer 61a to the outer peripheral portion of the region surrounded by the mask layer 51 to a selectively increased thickness. The second layer 61b may be formed from a treatment solution or dispersion of a material different from that of the first layer 61a.

When producing the solid electrolytic capacitor shown in FIG. 7 and FIG. 8, the solid electrolyte layer 61 extends over the outside of the region surrounded by the mask layer 51 and overlies the mask layer 51. Here, the solid electrolyte layer 61 may extend over two or more layers. For example, a portion inside the region surrounded by the mask layer 51 and a portion outside the region surrounded by the mask layer 51 may be formed separately; or the solid electrolyte layer 61 may be formed only inside the region surrounded by the mask layer 51, and subsequently, the solid electrolyte layer 61 may be additionally formed to extend over the outside of the region surrounded by the mask layer 51.

Next, in step S14, the conductor layer 62 is provided on the outer surface of the solid electrolyte layer 61. For example, carbon is applied to the outer surface of the solid electrolyte layer 61 to form a carbon layer, and silver is then applied to an outer surface of the carbon layer to form a silver layer. Subsequently, the cathode lead-out layer 63 is provided on the outer surface of the conductor layer 62.

The capacitor element 70 is prepared by steps S11 to S14 described above.

Next, in step S20, the capacitor elements 70 are enclosed in the insulating resin body 10. Specifically, the following steps S21 and S22 are performed.

In step S21, the multiple capacitor elements 70 are laminated on the board 11. Specifically, the multiple capacitor elements 70 are stacked on the board 11. At this time, preferably, the conductor layers 62 of the capacitor elements 70 are connected to the board 11 with a conductive adhesive such as a Ag paste. Subsequently, preferably, the board 11 and the capacitor elements 70 are bonded together by thermocompression.

In step S22, the multiple capacitor elements 70 are molded into a molded body, using an insulating resin such as an epoxy resin. Specifically, using the molding method, the board 11 is mounted on an upper mold, and while the insulating resin such as an epoxy resin is melted by heat in a lower mold, the upper mold and the lower mold are clamped. The insulating resin is solidified to form the molded portion 12.

Subsequently, in step S31, preferably, the above-obtained molded body including the board 11 and the capacitor elements 70 is cut into pieces in such a manner that the molded body is divided at the masked portion formed in step S12. Specifically, the molded body including the board 11 and the capacitor elements 70 is cut by press cutting, dicing, or laser cutting. Chips each including the insulating resin body 10 are formed in this step.

In step S32, preferably, the chips are barrel-polished. Specifically, the chips and abrasives are enclosed in a small box called barrel, and the barrel is rotated, whereby the chips are polished. Thus, corners and ridges of the chips are rounded.

In step S33, the first outer electrode 20 is formed on one end of the chip and the second outer electrode 30 is formed on the other end of the chip. For example, Cu plating layers are formed at both ends of the chip by electroplating. Then, Ni plating layers are formed on the respective Cu plating layers by electroplating. Subsequently, Sn plating layers are formed on the respective Ni plating layers by electroplating. The solid electrolytic capacitor 1 is produced by the above steps.

The solid electrolytic capacitor of the present invention may be produced by any method, such as one disclosed in JP 2019-79866 A. The entire contents of JP 2019-79866 A are incorporated herein by reference.

EXAMPLES

Examples that more specifically disclose the solid electrolytic capacitor of the present invention are described below. The present invention is not limited to these examples.

Production of Capacitor

Comparative Example

Figure 9:
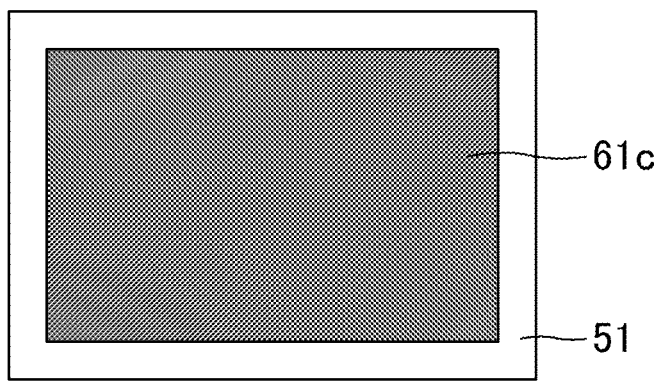
FIG. 9 is a schematic plan view of an example of a solid electrolytic capacitor of a comparative example.
Figure 10:
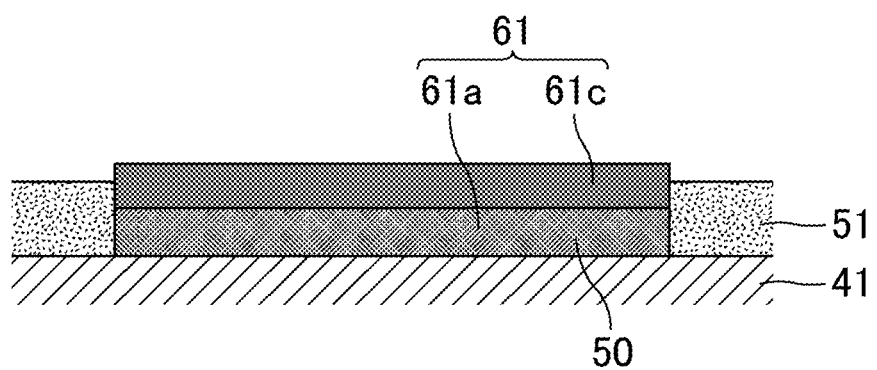
FIG. 10 is a schematic cross-sectional view of an example of part of the solid electrolytic capacitor of the comparative example.

FIG. 9 is a schematic plan view of an example of a solid electrolytic capacitor of a comparative example. FIG. 10 is a schematic cross-sectional view of an example of part of the solid electrolytic capacitor of the comparative example.

The mask layer 51 was formed to cover the periphery of the valve-action metal substrate 41 including the dielectric layer 50 on the surface as shown in FIG. 9 and FIG. 10. Then, the solid electrolyte layer 61 was formed in the region surrounded by the mask layer 51.

Chemically treated aluminum foil having an etched layer on a surface was prepared as the valve-action metal substrate 41. The surface of the chemically treated aluminum foil was immersed in an aqueous solution of ammonium adipate and anodized. Thus, the dielectric layer 50 was formed on a cut surface of the chemically treated aluminum foil.

The mask layer 51 was formed by applying a masking material to both surfaces of the valve-action metal substrate 41 by screen printing. The masking material was polyimide.

A conductive polymer dispersion was applied to the dielectric layer 50 in the region surrounded by the mask layer 51 by inkjet printing to form the inner layer 61a of the solid electrolyte layer 61. Further, a conductive polymer paste was screen-printed to form the outer layer 61c of the solid electrolyte layer 61.

A carbon paste was screen-printed on a surface of the solid electrolyte layer 61 to form a carbon layer. Subsequently, a silver paste was further screen-printed on the carbon layer to form a conductor layer. Thus, a capacitor element was obtained.

The obtained capacitor elements were stacked to obtain a stack. Subsequently, the stack was enclosed in an epoxy resin, and outer electrodes were formed, whereby a capacitor was obtained as a finished product.

Example 1-1

When forming the inner layer 61a of the solid electrolyte layer 61 by inkjet printing, the conductive polymer dispersion was reapplied selectively only to the outer peripheral portion of the region surrounded by the mask layer 51. With such an application pattern, a capacitor element shown in FIG. 4 and FIG. 5 was produced. Other than that, the same method as that of the comparative example was used, whereby a capacitor was obtained as a finished product.

Example 1-2

A capacitor element shown in FIG. 4 and FIG. 5 was produced by adding an additive that facilitates the occurrence of the coffee-ring phenomenon to the conductive polymer dispersion. The additive was ethanol. Other than that, the same method as that of the comparative example was used, whereby a capacitor was obtained as a finished product.

Example 2-1

When forming the outer layer 61c of the solid electrolyte layer 61 by screen printing, the conductive polymer paste was printed to form the outer layer 61c over the outside of the region surrounded by the mask layer 51. With such a printing pattern, a capacitor element shown in FIG. 7 and FIG. 8 was produced. Other than that, the same method as that of the comparative example was used, whereby a capacitor was obtained as a finished product.

Withstand Voltage

In order to evaluate the withstand voltage of each of the capacitors of the comparative example, Example 1-1, Example 1-2, and Example 2-1, the breakdown voltage of each of these capacitors was measured. For the measurement of breakdown voltage, the voltage of the capacitor while a constant current of 100 μA was applied to the capacitor elements for one minute was measured, and the maximum voltage reached was determined as the breakdown voltage. Table 1 shows values relative to the breakdown voltage of the comparative example taken as 1.

Rate of Change in ESR

The equivalent series resistance (ESR) at 100 kHz of each of the capacitors of the comparative example, Example 1-1, Example 1-2, and Example 2-1 was measured as the initial ESR, using an LCR meter. Further, these capacitors were left at 105° C. for 1000 hours for a high temperature load test, and were then subjected to ESR measurement at 100 kHz. Table 1 shows the rate of change in ESR (initial ratio) before and after the test.

TABLE 1

| | Breakdown voltage (relative value) | Rate of Change in ESR (initial ratio) |
|---|---|---|
| Comparative example | 1 | 1.5 times increase |
| Example 1-1 | 1.2 | 1.3 times increase |
| Example 1-2 | 1.2 | 1.2 times increase |
| Example 2-1 | 1.4 | 1.2 times increase |

The results of Example 1-1 and Example 1-2 show that the withstand voltage increases and the rate of change in ESR decreases when the second layer made of the same material as that of the first layer defining the inner layer of the solid electrolyte layer is provided at the outer peripheral portion of the region surrounded by the mask layer, with the thickness of the second layer being selectively increased.

The results of Example 2-1 show that the withstand voltage increases and the rate of change in ESR decrease when the solid electrolyte layer covers the outer peripheral portion of the region surrounded by the mask layer.

REFERENCE SIGNS LIST 1 solid electrolytic capacitor
10 insulating resin body
10a first main surface
10b second main surface
10c first side surface
10d second side surface
10e first end surface
10f second end surface
11 board
12 molded portion
20 first outer electrode
30 second outer electrode
40 anode portion
41 valve-action metal substrate
50 dielectric layer
51 mask layer
60 cathode layer
61 solid electrolyte layer
61a first layer (inner layer) of solid electrolyte layer
61b second layer of solid electrolyte layer
61c third layer (outer layer) of solid electrolyte layer 62 conductor layer
63 cathode lead-out layer
70 capacitor element

The invention claimed is:

1. A solid electrolytic capacitor comprising:
   a valve-action metal substrate having at least one main surface;
   a dielectric layer having pores on the at least one main surface of the valve-action metal substrate;
   a mask layer made of an insulating material and covering a periphery of the at least one main surface of the valve-action metal substrate having the dielectric layer; and
   a cathode layer on the dielectric layer, the cathode layer having a solid electrolyte layer that includes a first layer filling the pores of the dielectric layer in a region surrounded by the mask layer, a second layer on the dielectric layer and along an outer peripheral portion of the region surrounded by the mask layer, the second layer being made of a material same as or different from that of the first layer, and a third layer covering the second layer and the dielectric layer.

2. The solid electrolytic capacitor according to claim 1, wherein a thickness of the second layer is 0.1 μm to 2 μm.

3. The solid electrolytic capacitor according to claim 1, wherein a thickness of the second layer is 10% to 75% of a thickness of the third layer.

4. The solid electrolytic capacitor according to claim 1, wherein the third layer extends over an outside of the region surrounded by the mask layer and overlies the mask layer.

5. The solid electrolytic capacitor according to claim 4, wherein a width of the third layer on the mask layer is 10 μm to 100 μm.

6. The solid electrolytic capacitor according to claim 4, wherein a width of the third layer on the mask layer is 0.1% to 25% of a width of the mask layer.

7. The solid electrolytic capacitor according to claim 1, wherein the first layer is not on the mask layer.

8. The solid electrolytic capacitor according to claim 4, wherein the dielectric layer includes pores, and the solid electrolyte layer includes an inner layer filling the pores of the dielectric layer in the region surrounded by the mask layer, and an outer layer covering the inner layer and the dielectric layer and having a portion that extends over the outside of the region surrounded by the mask layer and overlies the mask layer.

9. The solid electrolytic capacitor according to claim 8, wherein a width of the solid electrolyte layer on the mask layer is 10 μm to 100 μm.

10. The solid electrolytic capacitor according to claim 8, wherein a width of the solid electrolyte layer on the mask layer is 0.1% to 25% of a width of the mask layer.

11. A method of producing a solid electrolytic capacitor, the method comprising:
    preparing a valve-action metal substrate including a dielectric layer having pores on at least one main surface thereof;
    adding an insulating material to a periphery of the at least one main surface of the valve-action metal substrate having the dielectric layer so as to form a mask layer covering the periphery; and
    forming a cathode layer on the dielectric layer at least within a region surrounded by the mask layer, wherein the forming of the cathode layer includes forming a solid electrolyte layer on the dielectric layer by:
      filling the pores of the dielectric layer with a first layer;
      forming a second layer on the dielectric layer along an outer peripheral portion of the region surrounded by the mask layer, the second layer being made of a material same as or different from that of the first layer; and
      covering the second layer and the dielectric layer with a third layer.

12. The method of producing a solid electrolytic capacitor according to claim 11, wherein the second layer is simultaneously formed with the first layer.

13. The method of producing a solid electrolytic capacitor according to claim 11, wherein the second layer is formed to have a thickness of 0.1 μm to 2 μm.

14. The method of producing a solid electrolytic capacitor according to claim 11, wherein the second layer is formed to have a thickness of 10% to 75% of a thickness of the third layer.

15. The method of producing a solid electrolytic capacitor according to claim 11, wherein the first layer is not formed on the mask layer.

* * * * *